(No Model.)

A. SCHULZE.
KITCHEN SINK.

No. 597,529. Patented Jan. 18, 1898.

WITNESSES

INVENTOR
Arthur Schulze
BY
his ATT'Y

UNITED STATES PATENT OFFICE.

ARTHUR SCHULZE, OF CHICAGO, ILLINOIS.

KITCHEN-SINK.

SPECIFICATION forming part of Letters Patent No. 597,529, dated January 18, 1898.

Application filed September 27, 1897. Serial No. 653,140. (No model.)

*To all whom it may concern:*

Be it known that I, ARTHUR SCHULZE, a citizen of the United States, residing at Chicago, in the county of Cook and State of Illinois, have invented a new and useful Improvement in Kitchen-Sinks, of which the following is a specification.

My invention relates to kitchen-sinks, and has particular reference to an improved arrangement of the sink embodying a movable draining-board and a draining-pan for receiving the dishes after same are washed.

The objects of my invention are, first, to provide a draining-pan for the dishes which will always be in position for use and which will not encumber the sink when not in use, and, second, to provide the sink with a movable draining-board which will serve as a cover for the compartment containing the draining-pan and which may be changed to such position as to uncover said compartment and still serve a useful purpose either as a draining-board or as a platform or table adjoining the sink. I accomplish these objects by the construction illustrated in the accompanying drawings, in which—

Figure 1:
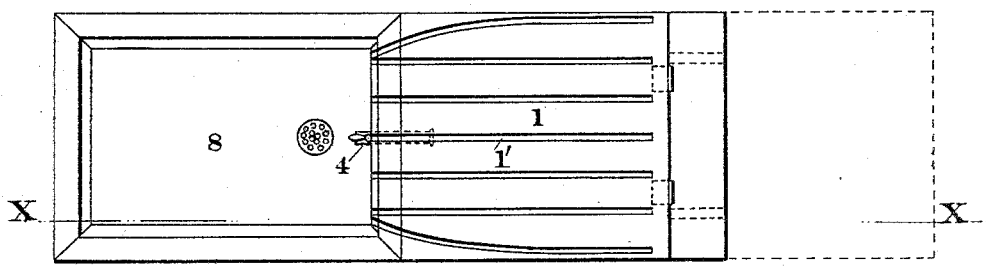
Figure 2:
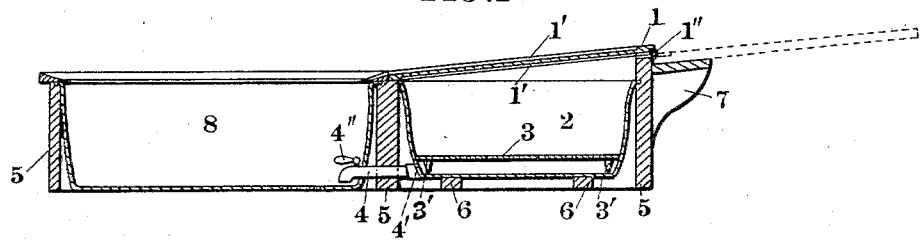
Figure 3:
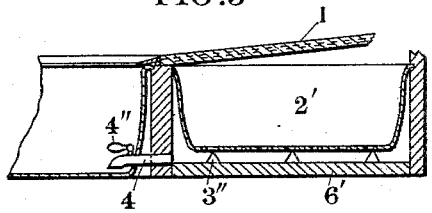

Figure 1 is a top plan of a sink embodying my invention, showing in dotted lines the position of the draining-board when the compartment containing the draining-pan is uncovered. Fig. 2 is a vertical section of same on the line $x\ x$ of Fig. 1. Fig. 3 is a vertical section of a modification, partly broken away, showing a modification of the draining-pan and the compartment for holding same.

In the construction shown in Figs. 1 and 2 the sink is supported in a frame 5, which extends beyond the sink proper, 8, under the draining-board 1, forming a compartment in which the draining-pan 2 is supported upon the cross-pieces 6. The draining-board is hinged to the frame at 1″. With the form of hinges shown the draining-board will preferably be provided with grooves 1′ on both sides, as same will have the reverse side up when laid over on its hinges, as shown by the dotted lines, and will thus also serve as a drainer when in the latter position. The pan 2 is provided with a removable perforated false bottom which is provided with projections 3′, supporting same free from the bottom of the pan. The false bottom is made removable, so that the pan may be conveniently cleaned. This false bottom may be omitted when the bottom of the pan is on an incline or otherwise suitably arranged for readily carrying the water away from the dishes. I prefer, however, to provide for supporting the dishes on a plane considerably elevated above the bottom of the sink 8, since it is thus less likely that an accidental backflow of water from the sink will come in contact with the dishes. It will be seen, however, that such backflow is guarded against by the cock or valve 4″ on the pipe 4, which may be closed whenever water is emptied into the sink from other sources than the draining-pan. The pipe 4 connects with the pan and empties into the sink 8 and is preferably provided with a removable connection 4′ at or near the pan, so that the pan may be removed when desired, as for cleaning or repairing. A stop or bracket 7 is provided at the end of the frame for supporting the draining-board when laid back.

In the modification shown in Fig. 3 a bottom 6′ is provided, making the compartment above same water-tight for carrying the water from the dishes to the sink. In this form the bottom of the pan 2′ is perforated and rests upon projections 3″ in the bottom of the compartment and the pipe 4 opens into said compartment.

I prefer the form shown in Figs. 1 and 2, since the frame will usually be made of wood, and in this form there is but little contact of the water with the wood, thus avoiding the rotting of same.

What I claim as my invention, and desire to secure by Letters Patent, is—

1. A kitchen-sink, comprising a sink, proper; a compartment adjoining same and adapted to contain a draining-pan; a pipe for carrying the water from said draining-pan into the sink, proper; and a cover for said compartment serving as a draining-board when closed and attached to the frame in such manner as to serve as a platform or draining-board adjoining said compartment when open, substantially as described.

2. A kitchen-sink, comprising a sink, proper; a compartment adjoining same and adapted to contain a draining-pan; a pipe for carrying the water from said draining-pan into the sink, proper; a bracket projecting from the free end of the frame of said compartment; and a draining-board for said sink, proper, normally covering said compartment, and hinged to the frame at said bracket in such manner as to form a platform adjoining said compartment, and supported by said bracket, when open, substantially as described.

3. A kitchen-sink, comprising a sink, proper; a compartment adjoining same having therein a draining-pan communicating with the sink, proper; and a cover for said compartment and draining-pan, serving as a draining-board when closed, and attached to the frame in such manner as to serve as a platform or draining-board adjoining said compartment when open, substantially as described.

4. A kitchen-sink comprising a sink, proper; a compartment adjoining same having therein a draining-pan communicating with the sink, proper; a perforated false bottom in said draining-pan; and a cover for said compartment and draining-pan, serving as a draining-board when closed, and attached to the frame in such manner as to serve as a platform or draining-board adjoining said compartment, when open, substantially as described.

ARTHUR SCHULZE.

Witnesses:
EMMA SCHULZE,
THERESE FUCHS.